March 17, 1970   A. L. McGEE ET AL   3,501,138
SHEET DISPENSER
Filed Aug. 30, 1967

FIG_1A

FIG_8

INVENTORS
ARTHUR L. MCGEE
DONALD W. CHAMBERLIN
BY
F. W. Anderson
C. E. Tripp
ATTORNEYS

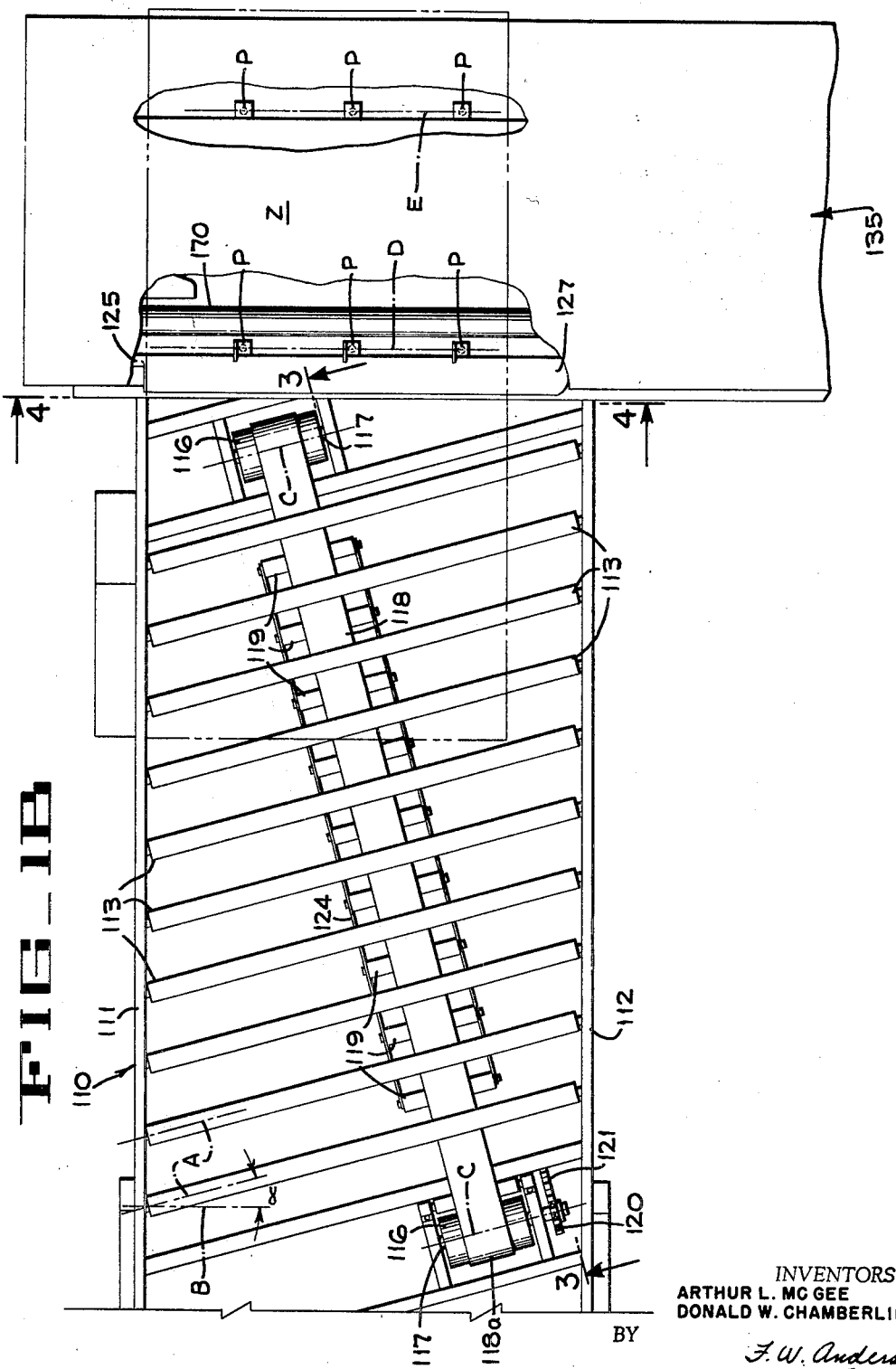

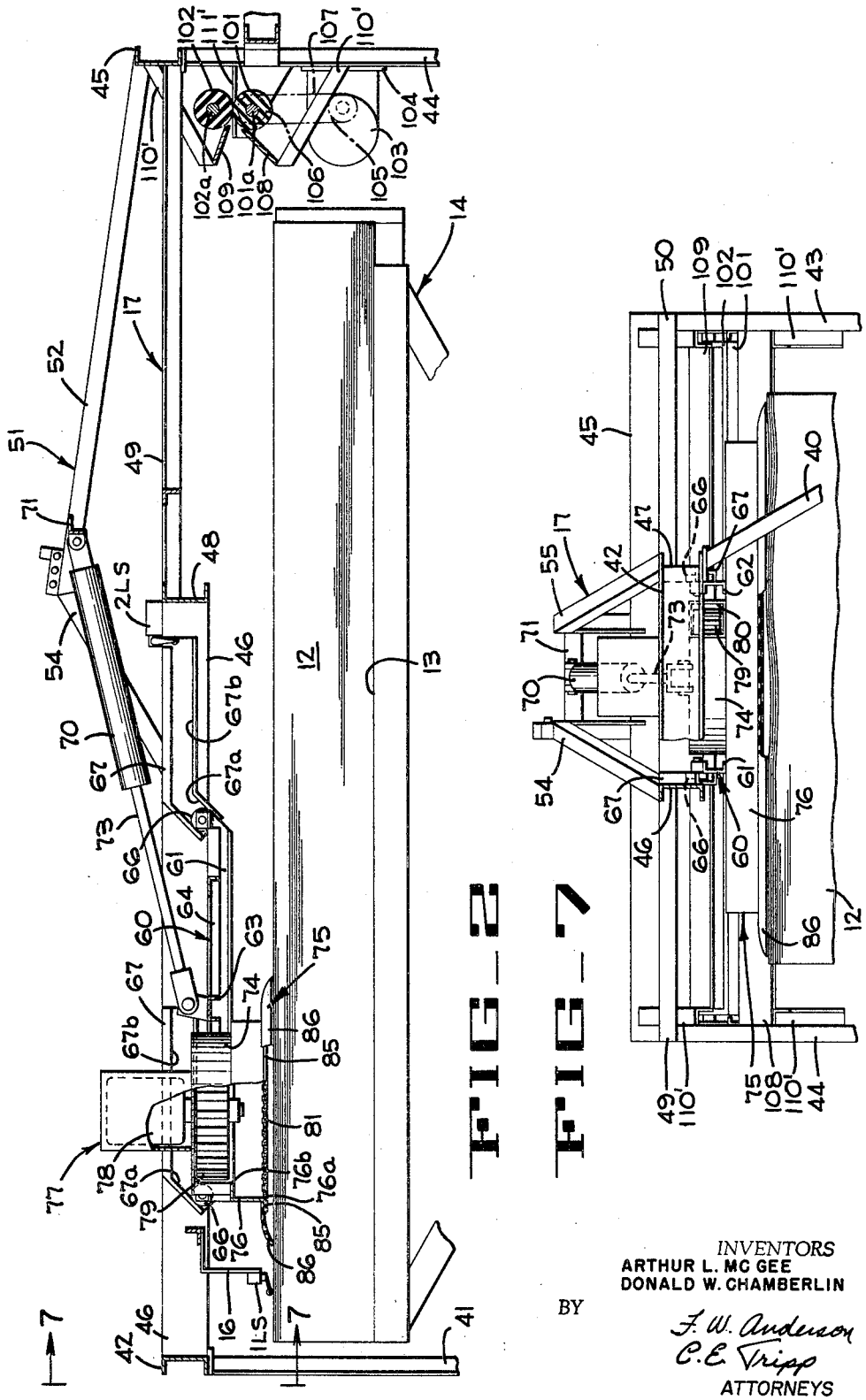

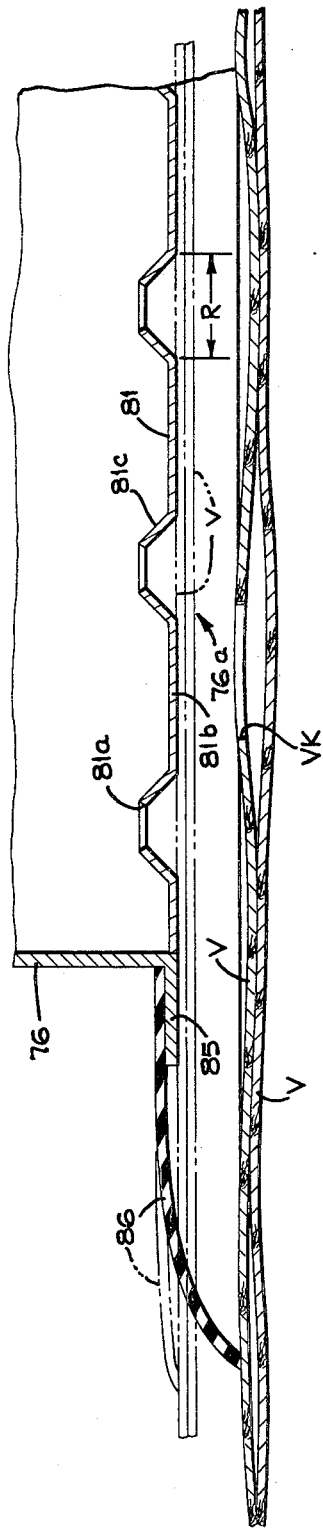

March 17, 1970   A. L. McGEE ET AL   3,501,138
SHEET DISPENSER
Filed Aug. 30, 1967   9 Sheets-Sheet 5
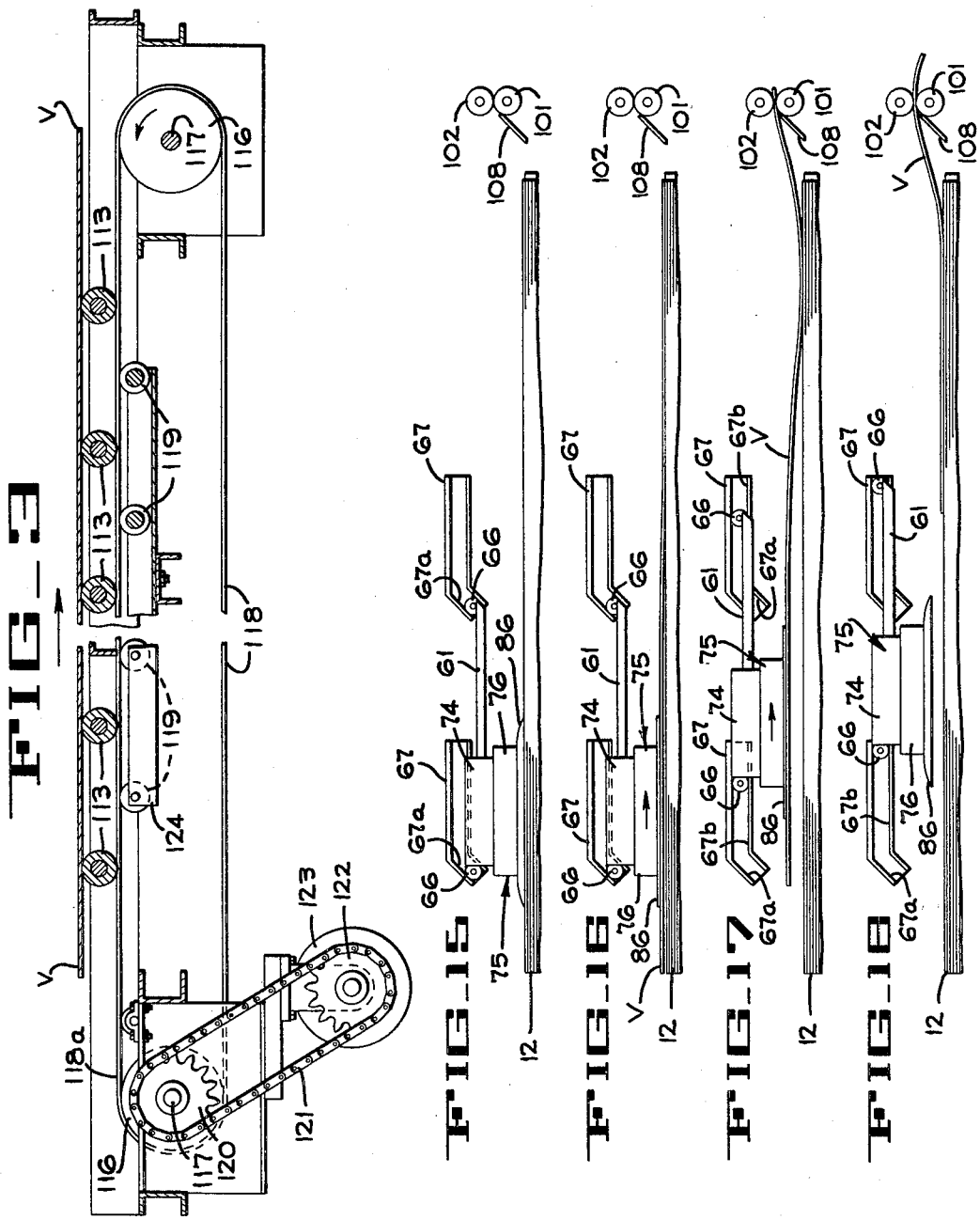
INVENTORS
ARTHUR L. MCGEE
DONALD W. CHAMBERLIN
BY
F. W. Anderson
C. E. Tripp
ATTORNEYS

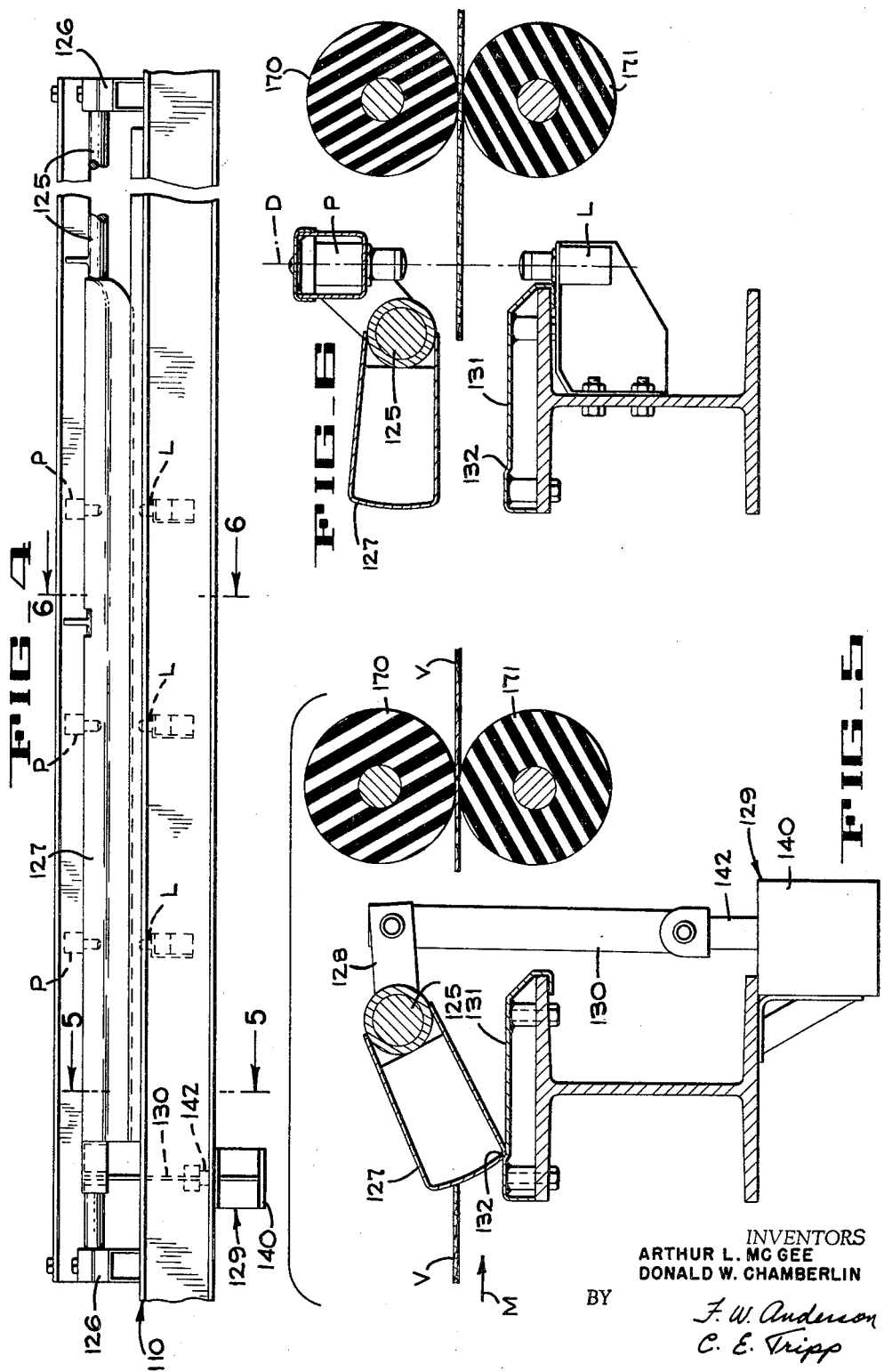

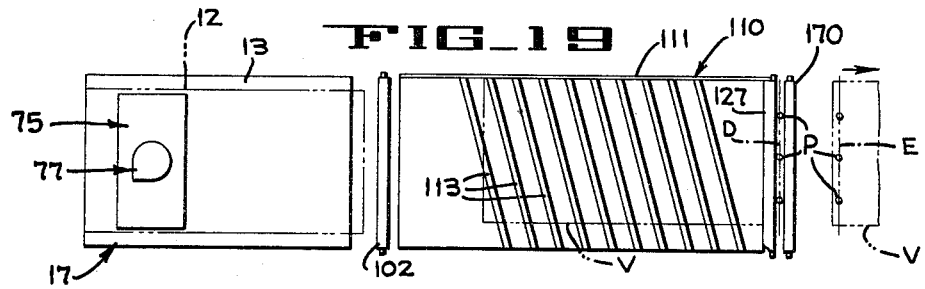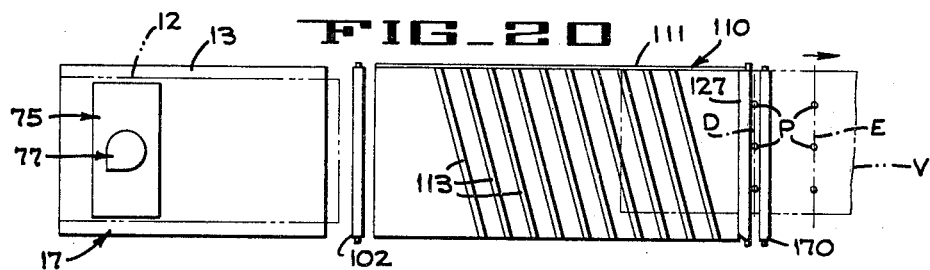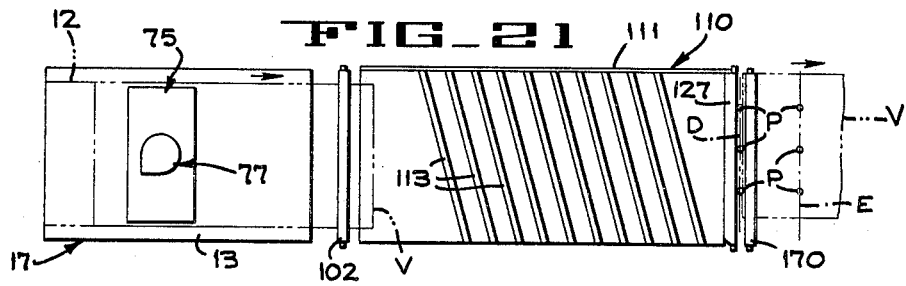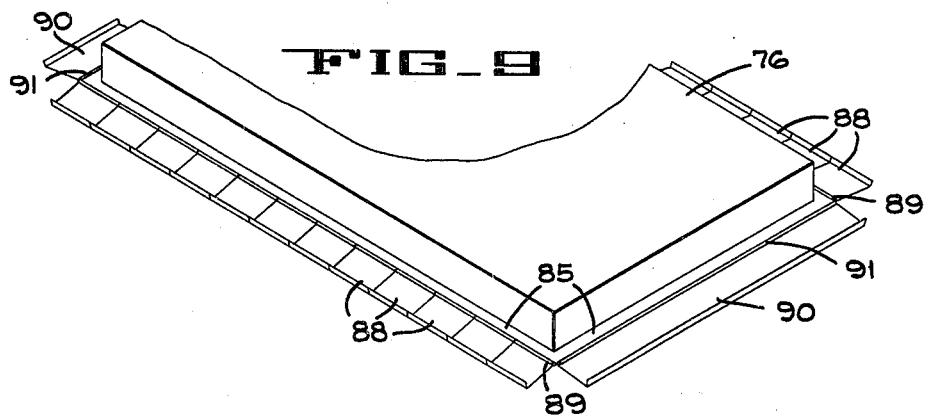

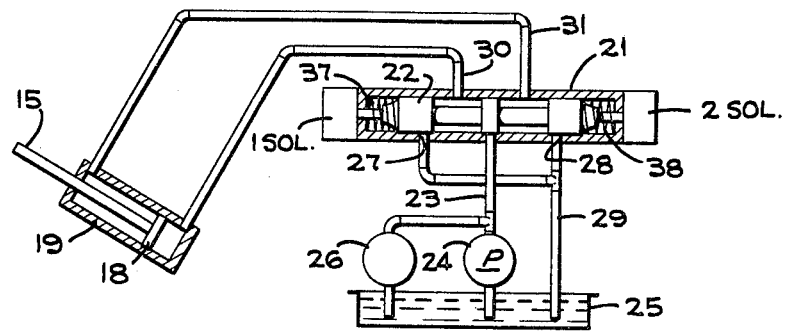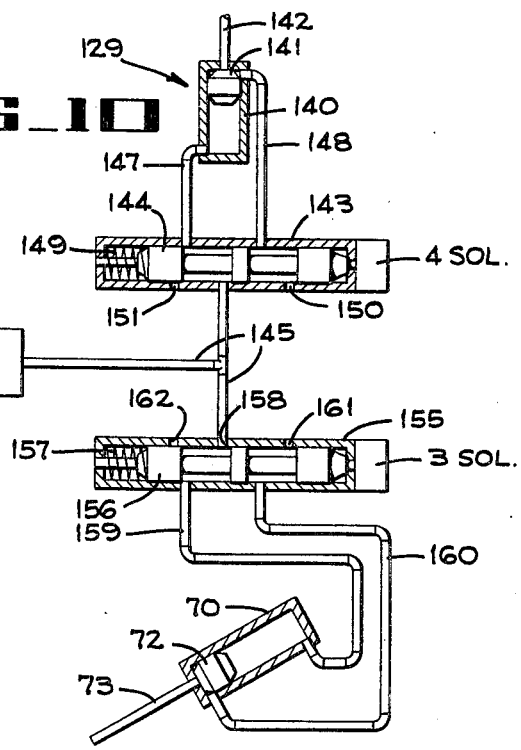

March 17, 1970    A. L. McGEE ET AL    3,501,138
SHEET DISPENSER
Filed Aug. 30, 1967      9 Sheets-Sheet 9
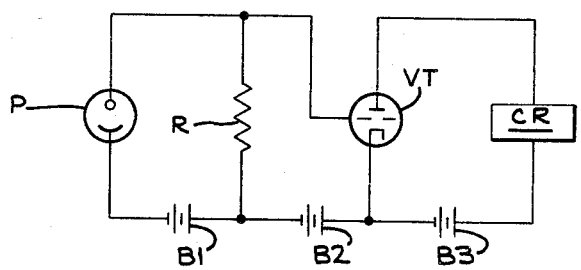
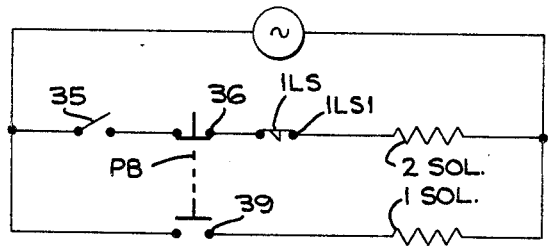
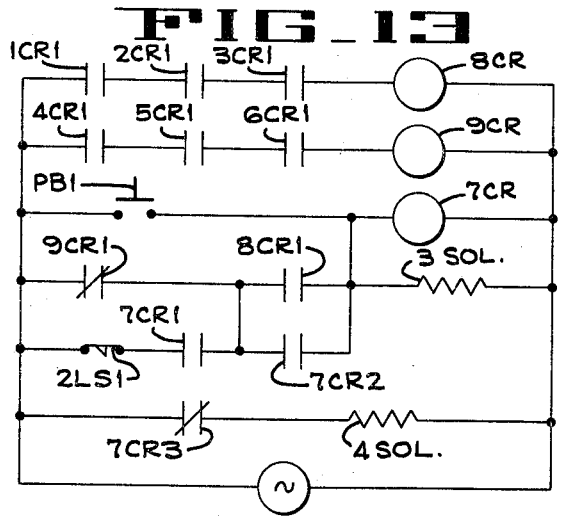
*INVENTORS*
ARTHUR L. McGEE
DONALD W. CHAMBERLIN
BY
*F. W. Anderson*
*C. E. Tripp*
         *ATTORNEYS*

United States Patent Office 3,501,138
Patented Mar. 17, 1970

3,501,138
SHEET DISPENSER
Arthur L. McGee, San Jose, and Donald W. Chamberlin, Los Gatos, Calif., assignors to FMC Corporation, San Jose, Calif., a corporation of Delaware
Filed Aug. 30, 1967, Ser. No. 664,472
Int. Cl. B65h 3/08, 5/00
U.S. Cl. 271—11                                5 Claims

ABSTRACT OF THE DISCLOSURE

Sheets of plywood veneer are dispensed automatically as required. A suction housing with a lower perforated plate and an encircling flexible skirt lifts one end of the top sheet of plywood veneer from a stack and feeds the sheet between guide plates to a pair of pinch rollers which strip the sheet from the housing. Slanted driven rolls carry the sheet from the pinch rollers, along an edge guide, to a movable stop, which, when down, arrests the sheet. A control, responsive to movement of a previous sheet, raises the stop, and the driven rollers move the sheet beyond the stop. As the trailing edge of the sheet passes the stop, the stop is again lowered and a new sheet is picked off the top of the stack.

Background of the invention

The present invention relates to mechanism for dispensing sheets of material, such as plywood veneer, from a stack.

In a typical mechanism for removing plywood veneer from a stack for use, for example, in a plywood patcher or assembler, the stack is mounted on a hydraulic lift which rises to a large suction housing. The suction housing lifts the top sheet off the stack and moves with the sheet to an operating position. A system of this type is relatively expensive and, because of the size of the suction housing and the distance the housing must travel, is frequently too slow in feeding sheets of veneer as required. Not infrequently, a conventional suction housing will pick up two sheets of plywood veneer instead of only one as desired. This occurs because the suction, which is strong enough to lift an entire sheet of veneer, acts through the veneer sheet, which is relatively porous, or through cracks and knot holes in the veneer sheet to pneumatically grip, or lift, the second sheet as well as the first, particularly when the sheets are compressed together by engagement with the suction housing. The strength of the suction increases the difficulty of removing veneer from the suction housing at the operating position of the machine.

Summary of the invention

In the present invention a sheet dispenser is provided which will deliver sheets of plywood veneer one at a time quickly and efficiently to the operating zone of a machine. In the preferred form of the invention, a relatively small suction head has an opening with a perforated plate therein. The opening is encircled by a flexible, or yieldable, skirt which is brought into contact with one end of the top sheet on a stack supported by a hydraulic lift. The flexible skirt permits the establishment of a vacuum on the upper surface of the sheet without pressing the suction housing down on top of the top sheet, which would press the top sheet onto the next sheet and materially increase the possibility of lifting both sheets. The contact of the flexible skirt does not flatten the top sheet, which normally has slight corrugations, and the air beneath the top sheet lifts one end of that sheet only into gripping engagement with the suction housing. If two sheets are lifted, the engagement of the top sheet with the perforated plate reduces air flow through any holes in the top sheet and therefore reduces the effective vacuum above the second sheet, and the second sheet will be released.

The suction housing does not move the sheet to a final desired position but, instead, slides the sheet between funneling guide plates into a pair of pinch rollers which, because of the relatively small size of the suction housing, easily strip the sheet from the housing. The sheet, after discharge from the pinch rollers, is received on slanted driven rollers which urge the sheet against an edge guide and against a movable stop located downstream from the pinch rollers. While the stop holds the sheet in a ready position, the suction head returns to a position above one end of the stack. A control system automatically raises the stop (to render the stop ineffective) when the next preceding sheet leaves the operating zone, and the sheet is moved by the driven rollers into the operating zone beyond the stop. The stop is lowered (to render the stop effective), in response to movement of the sheet completely into the operating zone, and the suction housing begins to advance another sheet in response of the stop. Thus a sheet is kept poised in the ready position for short, quick movement into the operating zone.

It is therefore one object of the present invention to provide relatively small and inexpensive mechanism for dispensing sheet material which is particularly effective in handling porous sheets (with holes and cracks) such as plywood veneer. It is another object of the present invention to provide plywood veneer dispensing mechanism that always picks up only one sheet. It is still another object of the present invention to provide a mechanism to dispense plywood veneer into an operating zone which mechanism keeps a sheet poised in a ready position adjacent the operating zone for movement into the operating zone as soon as the previous sheet is discharged therefrom.

Brief description of the drawings

FIGURES 1A and 1B are plan views of the mechanism of the present invention;
FIGURE 2 is a view taken on the line 2—2 of FIGURE 1A;
FIGURE 2A is an enlarged view, taken as the view of FIGURE 2, of a portion of the vacuum head;
FIGURE 3 is a view taken on the line 3—3 of FIGURE 1B;
FIGURE 4 is a view taken on the line 4—4 of FIGURE 1B;
FIGURE 5 is a view taken on the line 5—5 of FIGURE 4;
FIGURE 6 is a view taken on the line 6—6 of FIGURE 4;
FIGURE 7 is a view taken on the line 7—7 of FIGURE 2;
FIGURE 8 is a view taken on the line 8—8 of FIGURE 1A;
FIGURE 9 is a view of a modified skirt for the vacuum box;

FIGURE 10 is a schematic view of the pneumatic system for actuating the vacuum box and sheet stop;

FIGURE 11 is a schematic view of the hydraulic system for actuating the table lift;

FIGURE 12 is a schematic circuit for detecting the presence of a plywood sheet;

FIGURE 13 is a circuit for operating the pneumatic system of FIGURE 10;

FIGURE 14 is a circuit for operating the hydraulic system of FIGURE 11;

FIGURE 15 shows the vacuum box skirt engaging the top sheet of the stack;

FIGURE 16 shows the vacuum box lifting the rear end of the top sheet;

FIGURE 17 shows the vacuum box sliding the top sheet forwardly on the stack;

FIGURE 18 shows the nip rollers stripping the sheet from the vacuum box;

FIGURE 19 shows a first sheet leaving the operating zone and a second sheet against the stop in a ready position;

FIGURE 20 shows a sheet released from the ready position by the stop to enter the operating zone, the preceding sheet having left the operating zone; and FIGURE 21 shows a sheet advanced by the vacuum head as the trailing end of the preceding sheet enters the operating zone.

Description of the preferred embodiments

There is shown in FIGURES 1A and 1B apparatus for dispensing sheets from a stack 12 of plywood veneer sheets V which is received on the table top 13 (FIGURE 2) of a hydraulic lift 14. The lift 14, which is a conventional hydraulic lift of the type having a puller actuator shown, for example, in U.S. Patent 3,110,476, has a ram, or actuator, 15 (FIGURE 11) to raise the stack of veneer sheets. A bracket 16 (FIGURE 2) is connected to the frame 17 of the dispensing apparatus, and a limit switch 1LS is mounted on the bracket for operation by the top sheet of the stack 12.

The ram 15 (FIGURE 11), which is connected to a piston 18 received in cylinder 19, is controlled by a spring centered solenoid valve 21 having a shiftable valve member 22 therein. The valve has a pressure port connected by line 23 to a hydraulic pump 24 which draws fluid from sump 25. A relief valve 26 is connected between pressure line 23 and sump 25. The valve 21 has two discharge ports 27 and 28 through which fluid is returned to the sump by return line 29. The valve has two motor ports which are connected by lines 30, 31 respectively, to the opposite ends of the ram.

As shown in FIGURE 14, when the contacts of manually operated throw switch 35 are closed, when the normally closed contacts 36 of push button switch PB are closed, and when the normally closed contacts 1LS1 of limit switch 1LS are closed, solenoid 2SOL is energized to shift valve member 22 to the left (FIGURE 11). This introduces pressure fluid to motor line 31 to retract piston 18 of ram 15 and raise the table top 13. Fluid behind the piston is discharged through line 30, valve 21, port 27, and line 29. When the top sheet of veneer on stack 12 operates limit switch 1LS (FIGURE 14), the contacts 1LS1 thereof open to deenergize solenoid 2SOL (FIGURE 11). On the deenergization of solenoid 2SOL, the springs 37 and 38 of valve 21 center valve member 22 thereof to block flow to and from cylinder 19 and to stop actuation of the ram. As a sheet, or successive sheets, are removed from stack 12, limit switch 1LS is released so that normally closed contacts 1LS1 again close to energize solenoid 2SOL. Again, valve member 22 is shifted to actuate the ram and raise the table top until limit switch 1LS is again operated by engagement with the top sheet of the stack. When limit switch 1LS is operated, solenoid 2SOL becomes deenergized and valve member 22 is again centered to terminate actuation of ram 15 and elevation of the table top. If it is desired to lower the table top for reloading, push button switch PB (FIGURE 14) is manually depressed to open the normally closed contacts 36 thereof and to close the normally open contacts 39. Opening contacts 36 deenergizes solenoid 2SOL and closing contacts 39 energizes solenoid 1SOL so that valve member 22 (FIGURE 11) is shifted to the right. When the valve member 22 moves to the right, pressure fluid is introduced to the cylinder 19 behind piston 18 to advance the ram 15. Fluid from in front of the piston is discharged through line 31, valve 21, port 28, and line 29. Advance of the ram lowers the table for reloading.

The dispenser frame 17 includes two slanting rear legs 40, 41 (FIGURES 1A, 2, 7) connected at their upper ends to a rear cross beam 42 which extends therebetween. Two front legs 43, 44 have a front cross beam 45 extending therebetween. Two parallel longitudinal stringers 46, 47 extend forwardly from the rear cross beam 42 perpendicular thereto. The front end of the stringers 46, 47 are connected by cross beam 48. Diagonal support members 49, 50 extend from the ends of cross beam 48 to the front legs 43, 44. The frame has a superstructure 51 which includes two parallel longitudinal stringers 52, 53 sloping upwardly as they extend rearwardly from the front cross beam 45. Two support members 54, 55 connect the rear ends of stringers 52, 53 to the stringers 46, 47, respectively.

A carriage, indicated generally at 60, has two parallel longitudinal stringers 61, 62 connected together by cross beam 63 and diagonal support members 64, 65. Two rollers 66, a front and a rear roller, are connected to carriage stringer 61 to extend from one side of the carriage. Similarly, front and rear rollers 66 are connected to carriage stringers 62 to extend from the other side of the carriage. Two stationary tracks 67 are connected, respectively, to each of the two frame stringers 46, 47. One track on each stringer, the front track, receives the front roller of the carriage on that side and the other track on each stringer, the rear track, receives the rear roller of the carriage on that side. Each of the four tracks has a short incline section 67a at the rear end (FIGURE 2), and a horizontal section 67b extending forwardly therefrom.

The front end of a pneumatic cylinder 70 is pivotally connected to a cross beam 71 extending between the longitudinal stringers 52, 53 of the superstructure. The cylinder has a piston 72 (see FIGURE 10) slidably received therein which has connecting rod 73 attached thereto. The rear end of the connecting rod is pivotally connected to the cross beam 63 on the carriage. When the piston 72 is at the extreme rear end of cylinder 70 so that the carriage is in the extreme rear position, the four rollers 66 will be at the rear end of the four incline track sections 67a (see FIGURE 2). As the piston 72 is moved forwardly in cylinder 70, the carriage is initially raised in translation along an incline path parallel to the incline of track sections 67a, and then moved forwardly in translation along a horizontal path parallel to the horizontal track sections 67b.

A suction head, indicated generally at 75, has a vacuum housing, or box, 76. The underside of housing 76 has a rigid perforated plate 81 thereon which defines a suction opening 76a for gripping engagement with veneer sheets. The plate 81 has dimples 81c (FIGURE 2A) with recessed openings 81a which draw veneer sheets up to lands 81b. The blower 77 (FIGURE 2) has a housing 74 mounted on the vacuum box, and the blower housing has a fan 79 therein driven by motor 78. The fan 79, which rotates continuously while the dispensing mechanism is operated, expels air, drawn from the vacuum box 76 through opening 76b, out discharge opening 80 (FIGURE 7) in the blower housing. This air movement reduces the pressure in the vacuum box 76 to draw veneer sheets up to plate 81. The top of the vacuum box is secured to the two carriage stringers 61, 62 so that the suction head moves with the carriage.

It will be noted from FIGURE 7 that the plywood veneer sheets V, which are initially peeled from a log, are not flat but, instead, are corrugated. These corrugations are usually caused by differential moisture absorption, but they may also result from poor storage methods. As shown in FIGURES 2 and 2A, a lip 85 extends around the lower edge of the vacuum box 76, and a flexible, yieldable skirt 86 is connected to the lip to surround the box 76. The skirt, which is made of rubber, extends outwardly and downwardly from the lip, and the outer edge of the skirt is one or two inches below the lip 85. When the suction head is lowered to the stack, the flexible skirt contacts the top sheet of the stack and draws one end of the top sheet off the stack up into contact with the vacuum head. The flexible skirt has a tendency, when lowered onto the top sheet of the stack, to flex into conformation with the corrugations of the sheet. The flexibility of the skirt minimizes the openings to atmosphere around the vacuum box after the skirt contacts the top sheet of the stack so that a better suction grip can be obtained on the top sheet. The skirt, which flares outwardly, enlarges the effective vacuum area above the top sheet. The skirt is flexible so that it will deform as the top sheet is elevated by the vacuum created by the suction head. The most important function of the skirt, however, is to make possible a suction grip on the top sheet of the stack without bringing the vacuum head down onto the top sheet of the stack. If the vacuum head were pressed down on the stack, the top sheets of the stack would flatten out and be pressed together. Since it is the atmospheric pressure of the air under the sheet which urges the sheet up against the vacuum box, there is a greater tendency of the vacuum box to pick up two sheets, instead of the desired top sheet only, if the two top sheets have been pressed together to eliminate much of the air therebetween.

Even when the sheets V are not pressed together, there is a tendency for the simultaneous lifting of more than one sheet because of the porosity, or permeability, of the top sheet, and the presence of cracks and/or knot holes VK (FIGURE 2A) therein. The perforated plate 81, which prevents knots and debris from entering the housing 75, also serves to limit the number of sheets lifted at a time to one. If two sheets, for example, are lifted to the vacuum box, as shown in dotted lines in FIGURE 2A, the top sheet will be pressed against the lands 81b. As this occurs, the flow area through the top sheet is reduced from the total area encircled by the skirt 86 to the total of the areas R in the dimples under the recessed openings 81A. Although there is less total flow through areas R increases, increasing the pressure drop across the top sheet in these localized areas to maintain a firm grip on the top sheet. However, since the total flow through the top sheet, which comes from either edge openings between the two sheets or through the second sheet, has been reduced, the flow through the second sheet will be less. Thus, the pressure drop across the second sheet will be reduced. With a reduced pressure drop across the second sheet, the pressure difference is not great enough to sustain the second sheet, and that sheet will fall back on the stack.

Another form of yieldable skirt is shown in FIGURE 9. A plurality of plates 88 are connected by hinges 89 to the upper surface of the lip 85 at the front and rear of the vacuum box. These plates, which do not swing below a 45° angle to the horizontal because of contact with the lip, will, on contact with the upper sheet of the stack, assume positions conforming to the waves in the sheet even though the individual plates are rigid. If the stack tilts to one side or the other, the plates 88 will assume positions according to the tilt and prevent the entry of excessive air into vacuum box 76 to weaken or destroy the vacuum. On each side of the vacuum box, a continuous plate 90 is connected by hinge 91 to the upper surface of the lip. Since the plate 90 extends parallel to the waves, or corrugations in the sheet, the plate 90 need not be segmented to effectively seal the side.

When the piston 72 is retracted in cylinder 70, carriage 60 is raised (as rollers 66 move up incline track sections 67a) and then is moved forwardly (as rollers 66 move along horizontal track sections 67b). This upward and forward movement of the carriage lifts the rear, or trailing, end of the top sheet V only, and slides the sheet forwardly in a longitudinal direction along the stack. With the major portion of the sheet, including the forward edge, supported by the stack, less suction force is needed to control the sheet. It should be noted that the rising motion of the carriage may not be necessary if the flaps can flex upwardly enough to permit sufficient lift of the end of the top sheet.

As shown in FIGURE 8, horizontal bar 95 is connected to the rear side of each of the legs of 43, 44 and a pair of spaced pillow blocks 96 are connected to the underside of the bar 95 by bolts 97 threaded into bar 95. The bolts extend upwardly through bar 95 and slidably receive pillow blocks 98 above bar 95. Pillow blocks 98 are urged downwardly by springs 99, received on bolts 97 between the pillow block 98 and nuts 100. The shaft 101a, which carries a lower roller 101, is journaled in the pillow blocks 96 and the shaft 102a, which carries an upper roller 102, is journaled in the pillow blocks 98. A motor 103 (FIGURE 2) is mounted on a plate 104 connected to leg 44. Sprockets 105, 106 received, respectively, on the motor shaft and the roller shaft 101a, are connected by chain 107 to drive the lower roller continuously during operation of the machine. A lower plate 108 and an upper plate 109 are connected to brackets 110' which are connected to legs 43, 44. The plates 108, 109, which extend rearwardly from the throat 111 between the rollers 101 and 102, slope downwardly and upwardly, respectively, from the throat to define funneling guide plates for the plywood sheets. A sheet V, which slides forwardly on the stack, engages the lower plate 108 and is guided upwardly thereby between the rollers 101, 102. Since the leading edge of the sheet is supported by the stack to a point close to the lower guide plate 108, split edges are guided into the rollers without splitting off. The rollers 101, 102 grip the leading edge of the sheet and pull the sheet off the suction head.

A frame 110 in front of, or downstream from, the rollers 101, 102 has parallel, longitudinally extending side members 111, 112 as shown in FIGURE 1B. A plurality of rollers 113 are journaled in the side members with the longitudinal axes A of the rollers inclined at an angle α (say, for example, 15 degrees) to an imaginary line B perpendicular to the side frame members. The ends of the rollers journaled in side frame member 111 are positioned behind the ends of the rollers journaled in side frame member 112. The rollers 113 are driven so that sheets which move onto rollers 113 are moved against frame member 111, which extends above the top of the rollers 113, after the sheets are released by the rollers 101, 102.

As shown in FIGURES 1B and 3, two drums 116 are mounted on shafts 117 journaled in the frame 110 with their longitudinal axes C parallel to the axes A of rollers 113. The drums 116 receive an endless belt 118 the upper run 118a of which is continuously engaged with the bottoms of rollers 113. A plurality of idler rollers 119 journaled in a frame 124 are positioned under the upper run 118a of the belt to hold the belt in engagement with rollers 113. A sprocket 120 is mounted on one of the shafts 117 to receive an endless chain 121 which is driven by sprocket 122 received on the drive shaft of a motor 123 mounted in frame 110.

As shown in FIGURES 1B and 4, a shaft 125 is clamped in blocks 126 mounted on frame 110 downstream from the diagonal rollers 113. An elongated stop member 127 (FIGURES 5 and 6) is rotatably received on the stationary shaft and can pivot thereon down into (FIGURE 5), and up out of (FIGURE 6), the path of a sheet of plywood veneer V which is driven forwardly by the rollers 113. The stop has a lever arm 128 connected thereto which is connected to stop actuator 129 by means of link 130. The stop 127, when down in the path of an advancing sheet of plywood, engages a bed member 131 mounted on frame 110. The stop, when engaged with bed member 131, rests in a trough 132 therein, below the path of a sheet of plywood, so that the sheet can not pass under the stop when the stop is down.

A machine 135 (FIGURE 1B) for processing plywood sheets is located downstream of the stop 127. This machine may, for example, be an automatic plywood patcher as shown in the copending U.S. patent application of Roberts and Billett Ser. No. 634,951, filed May 1, 1967 and entitled Machine For Detecting and Patching Defects in Plywood Veneer.

Between the stop 127 and the machine 135, three lamps L are mounted on frame 110 beneath the path of a sheet of plywood, as shown in FIGURE 6. Over the path, and in the same vertical plan D in which the lamps are positioned, three phototubes, or photocells, P are mounted on shaft 125 in alignment with the lamps. In the machine 135, which is located in an operating zone Z, three lamps L and three phototubes P are mounted in alignment in a vertical plane E, the lamps below and the phototubes above the path of a sheet of veneer passing through the machine.

Each phototube P is incorporated in a circuit as shown in FIGURE 12. The phototubes P have photoemissive cathodes which emit electrons when illuminated and have anodes for collecting the electrons emitted by the cathode. An external source of D-C voltage, battery B1, is connected in circuit with the phototube to render the anode positive. When light strikes the tube, current flows around the phototube loop, which includes resistor R. The current flow through resistor R, which is connected in the grid circuit of vacuum tube VT, produces a voltage drop across the resistor. The change in voltage of the tube grid, which is normally biased by battery B2, changes the plate current of tube VT. Thus the current through the plate circuit, which includes battery B3 and control relay CR, will be an amplified image of the phototube current, and will energize relay CR when no veneer sheet is between the lamps L and phototube P.

The stop actuator 129, shown in FIGURES 5 and 10, comprises a cylinder 140 which has a piston 141 slidably received therein. The piston has a piston rod 142 which is connected to link 130. The operation of the pneumatic motor defined by the cylinder 140 and piston 141 is controlled by solenoid operated valve 143 having shiftable valve member 144 therein. A pressure port is connected to pressure line 145 which, in turn, is connected to a source 146 of air under pressure. Two motor ports in the valve 143 are connected, respectively, to motor lines 147, 148. Motor line 147 is connected to cylinder 140 below piston 141 and motor line 148 is connected to cylinder 140 above piston 141. The valve member 144 is connected at one end to solenoid 4SOL (FIGURE 13) and is engaged at the other end by spring 149. When the solenoid 4SOL is deenergized and the spring holds the valve member 144 in the extreme right hand position (as shown in FIGURE 10), air under pressure passes from line 145, through valve 143, and through line 147 to cylinder 140 below piston 141. This raises piston 141 and lowers the stop 127. Air above the piston is vented through line 148, valve 143, and discharge port 150. When solenoid 4SOL is energized to shift valve member 144 to the left (from the position shown in FIGURE 10) air under pressure will flow from line 145, through valve 143, through line 148, to the top of the cylinder 140. This will lower the piston 141 and raise the stop 127. Air from below the piston is vented through line 147, through valve 143, and out discharge port 151.

As shown in FIGURE 10, the cylinder 70 has a piston 72 therein which is connected to rod 73. The pneumatic motor defined by cylinder 70 and piston 72 is controlled by solenoid operated valve 155. Valve 155 has a valve member 156 therein which is connected at one end to solenoid 3SOL. The opposite end of valve member 156 is engaged by spring 157 which urges the valve member to the right when solenoid 3SOL is deenergized. The valve has a pressure port 158 which is connected to pressure line 145 and has two motor ports connected to motor lines 159, 160. Motor line 159 is connected to one end of cylinder 70 behind piston 72 and motor line 160 is connected to the opposite end of the cylinder in front of piston 72. When solenoid 3SOL is deenergized, the valve member 156 is in the right hand position as shown in FIGURE 10, air under pressure from line 145 passes through valve 155 to motor line 159. This advances the piston in the cylinder to move and lower the suction head to the rear position over the stack of plywood veneer. Air from in front of the piston is vented through line 160, valve 155, and out discharge port 161. When the solenoid is energized to shift the valve member to the left from the position shown in FIGURE 10, air from pressure line 145 passes through valve 155, through motor line 160, to cylinder 70 in front of piston 72. This retracts the piston and advances and raises the suction head. Air from behind the piston is vented through line 159, valve 155, and discharge port 162.

Each of the three phototubes P in plane D control a relay CR in the manner shown in FIGURE 12. Each of the three relays has one pair of normally open switch contacts (1CR1, 2CR1, and 3CR1, respectively), as shown in FIGURE 13. Each of the three phototubes P in plane E controls a relay CR. Each of the three relays has one pair of normally open switch contacts (4CR1, 5CR1, 6CR1, respectively). The phototubes, in planes D and E, acting in conjunction with lamps L, sense the presence or absence of a sheet of plywood veneer in plane D or E. Three phototubes in each plane, instead of a single tube, decrease the likelihood of a false signal being given because of a crack, or knot hole, in the sheet.

With solenoids 3SOL and 4SOL deenergized, valve members 156 and 144 will be in the positions shown in FIGURE 10. Consequently, the stop 127 will be down and the suction head will be to the rear and down with the skirt 86 engaged with the top sheet of the stack, as shown in FIGURE 15. As soon as the skirt contacts the sheet, the sheet is drawn up to the vacuum box as shown in FIGURE 16. To begin the automatic cycling of the sheet dispensing mechanism, the operator depresses push button switch PB1 (FIGURE 13), energizing relay 7CR and solenoid 3SOL. At this time, there is no sheet in plane D or E and all the phototubes are producing currents, so that all the relays CR are energized. Thus, normally open contacts 1CR1, 2CR1 and 3CR1 are closed to energize relay 8CR, closing contacts 8CR1 thereof. The normally open contacts 4CR1, 5CR1 and 6CR1 are also closed, and relay 9CR is also energized. Thus, normally closed contact 9CR1 is open. At this time, limit switch 2LS (FIGURE 2), which is operated by the carriage 60 when the carriage reaches the extreme forward position, is unoperated, and normally closed contacts 2LS1 are closed. Thus relay 7CR and solenoid 3SOL are sealed in through contacts 2LS1, normally open contacts 7CR1 and normally open contacts 7CR2.

When solenoid 3SOL is energized, the suction head advances, as shown in FIGURE 17, sliding the top sheet off the stack and into the pinch rollers 101, 102. When the carriage and suction head reach the extreme forward position, as shown in FIGURE 18, limit switch 2LS is operated to open contacts 2LS1 and drop relay 7CR and solenoid 3SOL. When relay 7CR is dropped, normally closed contacts 7CR3 thereof close to energize solenoid 4SOL. Energization of solenoid 4SOL lowers the piston 141 to raise stop 127. When solenoid 3SOL is dropped, the carriage is shifted back to the extreme rear position down on the stack where the suction head grips the rear of the top sheet.

It should be noted that when the carriage and suction head was forward and the previous sheet was gripped by the pinch rollers 101, 102, that sheet was pulled off the suction head and driven in a longitudinal direction through the rollers 101, 102 onto the diagonal, or angled, rollers 113. As shown in FIGURE 19, the angled rollers urge the sheet over against lateral guide 111 and drive the sheet forwardly to the stop 127, as indicated by arrow M. If the stop is raised, as it is at this time, the sheet is driven beyond the stop to be gripped by a pair of pinch rollers 170, 171 (FIGURE 6) in machine 135.

When the leading edge of the sheet passes plane D, relays 1CR, 2CR and 3CR become deenergized. Thus, contacts 1CR1, 2CR1, and 3CR1 open to deenergize relay 8CR and to open contacts 8CR1. When the leading edge of the sheet passes plane E, relays 4CR, 5CR and 6CR become deenergized. Thus contacts 4CR1, 5CR1 and 6CR1 open to drop relay 9CR, closing contacts 9CR1. When the trailing edge of the sheet passes plane D, relays 1CR, 2CR and 3CR are energized. Thus, contacts 1CR1, 2CR1 and 3CR1 again close to energize relay 8CR and close contacts 8CR1. At this time, then, relay 7CR and solenoid 3SOL become energized, through contacts 9CR1 and 8CR1. The relay 7CR and solenoid 3SOL are sealed in through contacts 2LS1, 7CR1 and 7CR2. The energization of solenoid 3SOL advances the suction head to insert another sheet in rollers 101 and 102.

When relay 7CR became energized, normally closed contacts 7CR3 open, dropping solenoid 4SOL to raise piston 141 and lower stop 127. Thus, the second sheet will be stopped at stop 127, as shown in FIGURE 19, poised in a ready position for insertion into the processing machine. In the meantime, the suction head 75 reaches its forward position and operates limit switch 2LS.

When the processing operation in machine 135 is completed on the first sheet, the trailing edge thereof will pass plane E, causing relays 4CR, 5CR and 6CR to become energized. Thus, limit switch contacts 4CR1, 5CR1 and 6CR1 close, energizing relay 9CR. Energization of relay 9CR causes normally closed contacts 9CR1 to open, dropping relay 7CR and solenoid 3SOL. When relay 7CR is dropped, normally closed contacts 7CR3 close, energizing solenoid 4SOL. Energization of solenoid 4SOL lowers piston 141 to raise stop 127. When stop 127 is raised, the second sheet enters the processing machine 135, as shown in FIGURE 20. When relay solenoid 3SOL becomes deenergized, suction head 75 returns to the stack 12, as shown in FIGURE 20. When the trailing edge of the second sheet passes plane D, as shown in FIGURE 21, the suction head moves forward with the next sheet.

Thus, it will be seen that as soon as a sheet is out of the zone of operation, another sheet is released from the ready position into the zone of operation. As soon as a sheet is out of the ready position, the next sheet is lifted off the stack and fed into the ready position.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, we claim:

1. Apparatus for dispensing sheets of plywood veneer from a stack comprising:
   (a) a housing mounted above one end of the stack, said housing having a suction opening on the underside thereof,
   (b) a rigid perforated plate covering said opening,
   (c) a flexible skirt surrounding said opening and depending from the housing,
   (d) means to effect relative movement between the housing and the stack to bring the skirt into contact with one end of the top sheet of the stack for drawing said one end of the sheet into gripping engagement with the housing,
   (e) means to shift the housing to slide said top sheet with respect to the stack,
   (f) a pair of rotatable pinch rollers adjacent the stack to receive the top sheet as it slides on the stack, said pinch rollers stripping the sheet from the housing,
   (g) a pair of guide plates straddling the opening between the pinch rollers to guide a sheet between the pinch rollers,
   (h) a movable stop downstream from said pinch rollers to hold a sheet discharged from the pinch rollers in a ready position,
   (i) an edge guide extending between the pinch rollers and the movable stop,
   (j) and a plurality of slanted driven rollers to receive a sheet discharged from the pinch rollers and to urge the sheet against the edge guide and toward the movable stop, said driven rollers holding the sheet against the stop when the stop is actuated and driving the sheet beyond the stop when the stop is rendered ineffective.

2. Apparatus for dispensing sheets of plywood veneer from a stack comprising:
   (a) a housing mounted above the stack, said housing having a suction opening on the underside thereof,
   (b) means to effect relative closing movement between the housing and the stack to draw the top sheet of the stack into gripping engagement with the housing,
   (c) a pair of rotatable pinch rollers adjacent the stack,
   (d) means to shift the housing to feed said top sheet between said pinch rollers, said pinch rollers stripping the sheet from the housing,
   (e) a movable stop downstream from the pinch rollers, said stop effective when actuated to hold a sheet discharged from the pinch rollers in a ready position, and
   (f) a control responsive to movement of the previous sheet to move said stop and release said sheet.

3. The apparatus of claim 2 including means responsive to movement of said sheet beyond the stop to replace the stop, and means responsive to replacement of the stop to effect relative closing movement between the housing and the stack.

4. Apparatus for dispensing sheets of plywood veneer from a stack comprising:
   (a) a housing mounted above the stack, said housing having a suction opening on the underside thereof,
   (b) means to effect relative closing movement between the housing and the stack to draw the top sheet of the stack into gripping engagement with the housing,
   (c) a pair of rotatable pinch rollers adjacent the stack,
   (d) means to shift the housing to feed said top sheet between said pinch rollers, said pinch rollers stripping the sheet from the housing,
   (e) a movable stop downstream from the pinch rollers, said stop effective when actuated to hold a sheet discharged from the pinch rollers in a ready position, and
   (f) means to control movement of said housing in coordination with operation of said stop.

5. Apparatus for dispensing sheets of porous materials from a stack comprising a flat-faced plate having a plurality of individual openings therein, means for providing a suction force to said openings, a flexible skirt surrounding said plate and depending therefrom, said skirt comprised of a plurality of adjacent plate segments with each segment being pivotally mounted to the perimeter of said flat-faced plate, and means for moving said plate downwardly towards a stack of sheets of porous material until the top sheet thereof contacts the lower edge of said skirt to provide a vacuum over said top sheet and to permit it to be drawn upwardly into contact with said plate.

References Cited

UNITED STATES PATENTS

| | | | |
|---|---|---|---|
| 2,849,231 | 8/1958 | Reguly | 271—11 |
| 3,005,652 | 9/1961 | Helm | 271—26 |
| 3,154,306 | 9/1964 | Elliott | 271—26 |
| 3,256,011 | 6/1966 | Buccicone | 271—86 |
| 1,294,103 | 2/1919 | Hitchcock | 294—64 |
| 1,334,451 | 3/1920 | Hanau | 294—64 |
| 2,838,306 | 6/1958 | Williams | 271—31 |
| 2,853,333 | 9/1958 | Littell | 294—64 |
| 2,971,415 | 2/1961 | Gibson | 271—5 |

RICHARD E. AEGERTER, Primary Examiner

U.S. Cl. X.R.

271—26

PO-1050
(5/69)

UNITED STATES PATENT OFFICE
CERTIFICATE OF CORRECTION

Patent No. 3,501,138            Dated March 17, 1970

Inventor(s) A. L. McGEE et al

It is certified that error appears in the above-identified patent and that said Letters Patent are hereby corrected as shown below:

Column 5, lines 53-56, delete "Although there is less total flow through areas R increases, increasing the pressure drop across the top sheet in these localized areas to maintain a firm grip on the top sheet." and substitute --Although there is less total flow through the top sheet because of the reduced flow area, the localized flow through areas R increases, increasing the pressure drop across the top sheet in these localized areas to maintain a firm grip on the top sheet.--.
Column 6, line 39, change "111" to --111'--.
Column 8, line 17, before "cylinder" insert --the--.
Column 10, line 70, change "materials" to --material--.

Signed and sealed this 14th day of September 1971.

(SEAL)
Attest:

EDWARD M. FLETCHER, JR.            ROBERT GOTTSCHALK
Attesting Officer                  Acting Commissioner of Patents